June 5, 1951  A. S. KROTZ  2,555,649
VEHICLE SUSPENSION AND CONTROL FOR STEERING WHEELS
Filed April 30, 1945  3 Sheets-Sheet 2

Patented June 5, 1951

2,555,649

UNITED STATES PATENT OFFICE 2,555,649

VEHICLE SUSPENSION AND CONTROL FOR STEERING WHEELS

Alvin S. Krotz, Akron, Ohio, assignor to The B. F. Goodrich Company, New York, N. Y., a corporation of New York Application April 30, 1945, Serial No. 591,215

6 Claims. (Cl. 280—96.2)

The invention relates to suspension and steering systems for vehicles and especially to suspension systems of the independent wheel suspension type utilizing rubber as the springing medium and to steering systems for the dirigible wheels of such suspension systems.

Objects of the invention are to provide improved riding qualities of the vehicle; to provide improved steering qualities of the vehicle; to provide an improved independent suspension providing effectively for cushioning movements in all directions; and to provide an improved wheel mounting and suspension of a compact unitary character which makes possible improved vehicle design and construction.

Other objects are to provide in the wheel suspension of the independent type for transmitting the supported load to the wheel through a single supporting arm and a spring of resilient rubber-like material by torsional stress of such material and to provide for wheel deflection with low change in the camber, the track, and the caster thereof; to provide effectively for counteracting the "ducking" tendency of the front end of the vehicle under braking action; to provide for effectively absorbing and cushioning shock, especially with little or no effect on the steering action; to provide effectively for wheel deflection with little or no effect on the steering action; and to provide for supporting steering means directly from the wheel suspension structure and permitting relative movement therebetween.

Further objects of the invention are to provide for maintaining an adequate range of springing movement under all conditions of load by maintaining the vehicle body at a constant or substantially constant height with respect to the wheels; to provide for fully automatic operation in this regard; and to provide strength of construction with light weight and reliability and effectiveness of operation.

These and other objects and advantages will be apparent from the following description, reference being had to the accompanying drawings in which.

In the illustrative embodiment of the invention shown in the drawings, the vehicle includes a frame or body structure 15 supported by front and rear wheels 16, 17, 18 and 19 sprung by torsion spring assemblies of resilient rubber or rubber-like material adapted to transmit the supported load by torsional stress on the rubber. Such wheels are desirably provided with suitable pneumatic tires 16c, 17c, 18c and 19c for cushioning purposes.

The frame 15 includes main side rails 20, 21, of channel sections connected by cross-members 22, 23 and includes X-members 24, 25 reinforced at the center by upper and lower gusset plates 26, 27 and anchored at the corner junctions of the side rails and cross-members. Corner plates 28, 29, 30, 31 additionally stiffen the frame. Spaced-apart side rails 32, 33 including brackets 34, 35 project forwardly from the upwardly bent cross-member 22 at the front of the vehicle for facilitating mounting a gasoline engine or other suitable power plant 36 and transmission 37 on the frame, the transmission 37 being suitably connected as by a drive shaft 37a with the final-drive in a housing 153. Spaced-apart side rails 38, 39 connected by cross-members 40, 41, project rearwardly from the cross-member 23 at the rear of the vehicle and are bent upwardly to form a kick-up over swingable half-axles 42, 43 to lower the center of gravity and allow room for spring-action. The respective parts of the frame are united as by welding, riveting, bolting or other suitable fastening means and are arranged to give greatest strength of construction consistent with light weight.

Figure 1:
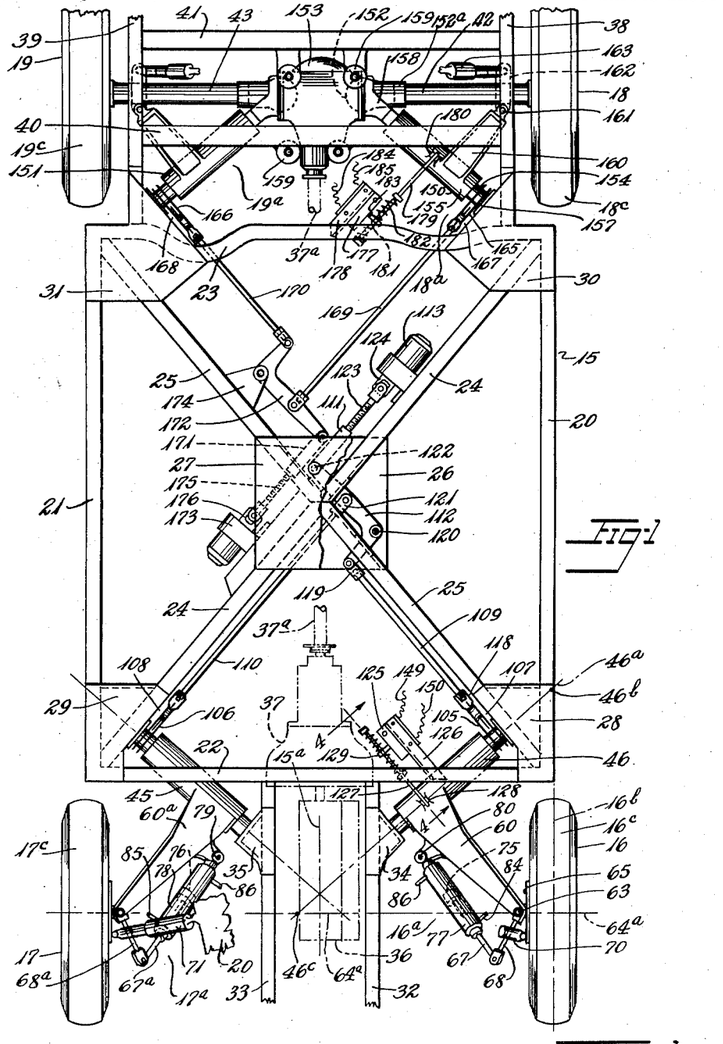
Fig. 1 is a plan view from above of a vehicle chassis including suspension and steering systems constructed in accordance with and embodying the invention, parts being broken away.
Figures 2, 4, 5:
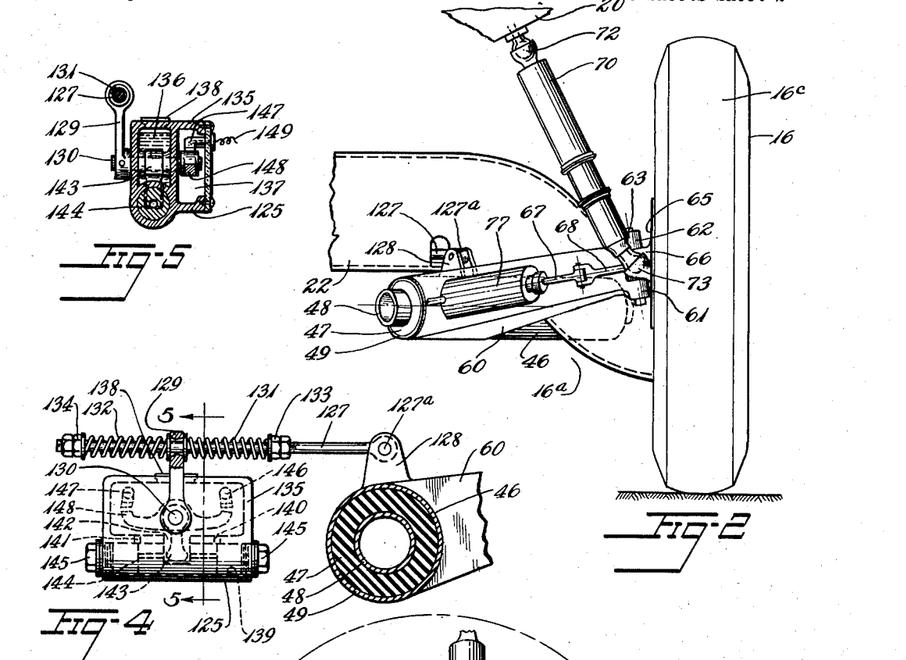
Fig. 2 is a front elevation of the left front dirigible wheel mounting and suspension, parts being broken away.
Fig. 4 is a view taken along line 4—4 of Fig. 1 and shows a height control mechanism in association with a rubber bushing, parts being broken away and in section.
Fig. 5 is a sectional view of such mechanism taken along line 5—5 of Fig. 4.
Figures 6, 9:
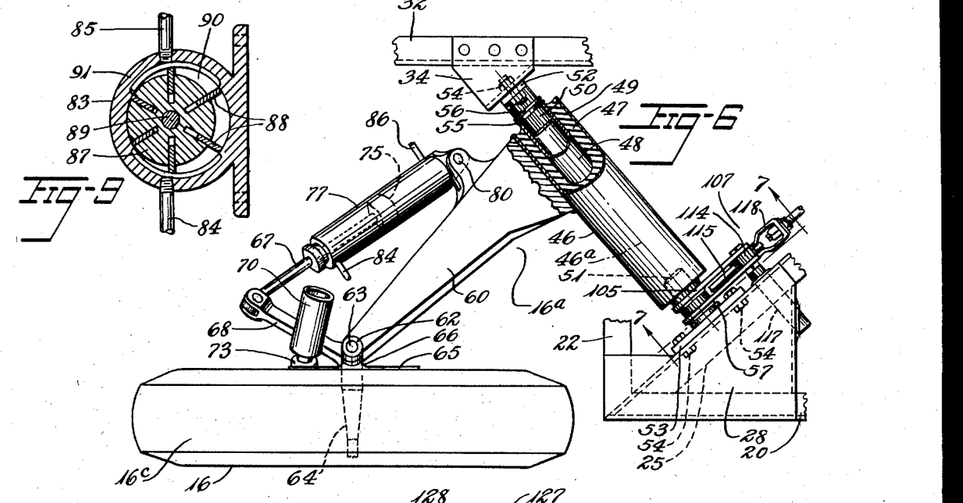
Fig. 6 is a plan view from above of the wheel mounting and suspension shown in Fig. 2, parts being broken away and in section.
Fig. 9 is a sectional view taken along line 9—9 of Fig. 8 and showing a rotary vane type pump, parts being broken away.

The suspensions 16a and 17a of the front wheels 16 and 17, as shown especially in Figs. 1, 2 and 6, are of the independent type in the sense that vertical movement of one wheel above or below its normal position is accompanied by little or no change in the deflection of the other wheel. The invention provides for springing the front wheels relative to the frame or body structure 15 by means of a pair of resilient rubber torsion spring assemblies 45, 46 mounted on the frame and arranged in a diagonal manner such that their axes extend obliquely outward with respect to the vertical longitudinal center-plane 15a of the vehicle. While the spring assemblies may be arranged in various ways and the frame or other structure varied accordingly, in the arrangement illustrated in the drawings, the axes of the springs converge toward the front of the vehicle. The assemblies are adapted to transmit the supported load by torsional stress on the rubber and to permit limited cushioned movement in all directions so that in effect the springs tend to find their own axes.

The construction and arrangement of the suspensions 16a and 17a for the front wheels being substantially the same except for the respective right and left hand positioning, only the suspension 16a for the left front wheel 16 will be described in detail hereinafter. The torsion spring assembly 46 comprises a body 47 of resilient rubber or rubber-like material, preferably annular, having an inner shaft element 48 of metal or other strong rigid material and an outer sleeve structure 49 of suitable strong material, which outer sleeve structure 49 may be circumferentially continuous as shown or may be in the form of separate metal sleeve sections, and the rubber body 47 is held in non-rotative relation to the inner shaft element and the outer sleeve structure such, for example, as by vulcanization and bonding thereto. The torsion spring assembly 46 being diagonally positioned relative to the vertical longitudinal center-plane or plane of symmetry 15a of the vehicle in the manner shown in the drawings, may be supported rotatably on journal extensions 50, 51 of mounting plates 52, 53 detachably secured to the bracket 34 and the X-member 25 as by spaced-apart bolt fastener means 54, the journal extensions telescopically engaging end portions of the inner shaft element 48, as shown especially in Fig. 6. Preferably, a sealing ring 55 of suitable rubber-like material is positioned at a projecting flange 56 of the journal extension 52 in contact with the end of the inner shaft 48 for preventing the entrance of foreign matter such as oil, dirt and water at such end of the inner shaft, the outwardly projecting flange 56 functioning to position the inner shaft 48 on the journal extension 52 and prevent relative axial movement therebetween. The other end of the inner shaft 48 may also be similarly positioned on the journal 51 adjacent the plate 53 and be sealed by a suitable sealing ring 57. This mounting arrangement of the torsion spring assembly 46 provides effectively for cushioning movements in all directions by the resilient rubber body 47, which permits some relative movement, longitudinally, transversely and rotatively, between the inner shaft 48 and the outer sleeve 49, this being advantageous in diminishing road-shock impacts and harshness of riding qualities.

A supporting arm 60 integrally secured at one end to the outer sleeve 49 projects forwardly relative to the axis 46a of the torsion spring assembly 46, as shown especially in Figs. 2 and 6. The supporting arm 60 may be bifurcated at the outer end and have spaced-apart pivot bearings 61, 62 for providing a pivotal or king-pin axis 63 with a member 66 rigid with a wheel spindle 64 and brake spider plate 65, the arrangement being such that the wheel has a steering or turning movement about such axis. As shown in Fig. 2, this axis is canted somewhat as viewed from the front to provide a scrubbing radius for the wheel contact with the road surface.

The wheel 16 is rotatably mounted on the wheel spindle 64 which spindle is fixed to the non-rotating brake spider plate 65 and the member 66, which member is rigidly connected to a steering arm 68 extending angularly forward with respect to the axis of such spindle. The steering arm 68 is pivotally connected at its forward end to a steering rod 67 of steering mechanism more fully described hereinafter.

Such mounting and suspension arrangement for the front wheel 16 makes possible transmitting road shocks and loads directly to the frame 15 or body structure at a region thereof of relatively great structural strength and stiffness. Thus, objectionable misalignment of the respective parts of the suspension due to distortion of the frame by such shocks is avoided effectively at the same time with a minimum of supporting parts of the frame.

The diagonal suspension utilizing rubber as the springing medium provides in a single compact assembly combined advantageous operating characteristics not found entirely in prior constructions employing longitudinal or transverse arrangements. In prior constructions having a torsion spring axis disposed longitudinally of the vehicle, the wheel supporting arms have been relatively short in length because of space limitations laterally of the vehicle, being generally less than one-half the width of the vehicle. Such short supporting arm mounting of the wheel results in objectionably large change in the camber and track of the wheel but with little or no change in the caster thereof under wheel deflection. Attempts heretofore to increase the lengths of such transverse arms have resulted in objectionably complicated mechanical construction and have not been entirely satisfactory for the purpose intended.

In prior constructions having a torsion spring axis disposed transversely of the vehicle with relatively long fore and aft supporting arms, such springing arrangements result in zero change in the track and camber of the wheels, in objectionably large change in the caster thereof, and in difficulty of providing for steering clearances. Also, such transverse spring constructions have low resistance to roll or side-sway of the vehicle; since the roll center of the front wheel geometry being substantially at the level of the ground-contact points of the wheels, is relatively far removed vertically from the center of gravity of the suspended parts of the vehicle resulting in a relatively long effective moment arm between the center of gravity and the roll center.

However, the front wheel suspension shown in the drawings, having the torsion spring axis 46a disposed diagonally of the vehicle about which axis the supporting arm and wheel swing, overcomes the disadvantages of the prior constructions by virtue of a new relationship of cooperating elements comprising such suspension.

An advantage of the diagonally arranged front wheel suspension, as shown, resides in the fact that the instantaneous roll center of the front wheel geometry lies above the plane of ground contact and may be substantially as high as the axis of the torsion spring assembly 46 so as to be closer vertically to the center of gravity of the suspended parts resulting in a relatively shorter effective moment arm between the center of gravity and the roll center than in the prior arrangement hereinabove discussed; therefore such diagonal suspension is relatively highly resistant to roll of the vehicle during turning movement thereof.

A further advantage of the diagonal suspension arrangement 16a, for example, is that the front wheel 16 is supported elastically from the frame 15 in a manner obviating the use of the conventional pseudo-parallelogram linkage generally found in some types of independent wheel suspensions, which diagonal wheel arrangement thereby advantageously makes possible a practical and improved single arm wheel mounting and suspension of a compact unitary character facilitating improved vehicle design and construction. Under wheel deflection, the front wheel 16 swings about the diagonally positioned axis 46a of the torsion spring assembly 46, the tangible arm of such swinging movement being in a plane perpendicular to such torsion spring axis 46a and extending from a center in such plane on the torsion spring axis to the king-pin axis 63 at the center-line of the wheel spindle 64, i. e. substantially the length of the supporting arm 60 relative to the torsion spring axis.

However, by virtue of such diagonal arrangement, the lengths of the intangible or effective arms of swinging movement of the suspension extending in the longitudinal and transverse directions of the vehicle are each considerably greater than the length of the tangible arm of swinging movement or supporting arm 60, thereby promoting improved riding and steering qualities of the vehicle.

The effective arm extending longitudinally of the vehicle lies in a vertical plane coincidental with the center-line 16b of the wheel 16 and extends rearwardly of the center-line 64a of the wheel spindle 64 to a center 46b at the intersection of such plane and the rearward prolongation of the axis 46a of the torsion spring assembly 46. The longitudinal effective arm is relatively long as compared to the supporting arm 60 resulting in a desirably small change in the caster under wheel deflection thereby substantially maintaining the desired steering characteristics of the vehicle throughout the normal wheel stroke, and is also sufficiently long to effect the desired resultant upward force on the frame rearwardly of the wheel to balance the weight transferred to the front wheel under braking of the vehicle thereby advantageously counteracting the tendency of the front of the vehicle to "duck."

The effective arm extending transversely of the vehicle lies in a vertical plane passing through the point of road-contact of the wheel 16 and extends from such point of road-contact to a center 46c at the intersection of such plane and the forward prolongation of the axis 46a of the torsion spring assembly 46, which center 46c may be at the vertical longitudinal center-plane 15a and for the arrangement shown is desirably located beyond the vertical longitudinal center-plane 15a of the vehicle in the direction away from the wheel 16. Such transverse effective arm is relatively long (greater than one-half the width of the vehicle for the arrangement shown in Fig. 1) as compared to the supporting arm 60 resulting in a desirably low rate of change in the camber and track of the wheel 16 for the effective range of wheel deflection.

Some change in camber is ordinarily desirable, that is, loss of camber as the wheel lifts and increase in camber as it drops, as this results in keeping the wheel more nearly perpendicular to the road surface during sway or roll and thereby increases the cornering power of the wheel. However, too great an amount of change in camber, especially in the usual range of wheel deflection, will cause gyroscopic forces which tend to disturb steering control.

Also, there is a distinct advantage in having a controlled amount of change in track in each wheel as it lifts or falls, the contact point of the wheel on the road moving outwardly as the wheel lifts and moving inwardly as it drops, as this action resists the tendency of the vehicle to roll on turns, or in effect, raises the roll center for those wheels. However, too great a change in track, particularly for small amplitudes of wheel deflection or stroke, is objectionable because it causes some transverse loading of the wheel which in turn has been found to develop a turning movement about the king-pin axis. A preferred compromise for both camber and track change is an effective transverse arm length of half or more than half the width of the wheel track, which result is obtained by the construction shown in the drawings.

If desired, the axis 46a of the torsion spring assembly 46 may be inclined downwardly in the forward direction for moving the road-contact point of the wheel in the forward direction as the wheel lifts toward the frame thereby further resisting the tendency of the front end of the vehicle to "duck" during braking action. Such inclined arrangement of the torsion spring is more fully described and claimed in my Patent #2,226,406 for "Vehicle Wheel Mounting," granted December 24, 1940.

While the rubber of the torsion spring assembly 46 (45) possesses a degree of shock-absorbing ability, it is desirable that a direct-action shock absorber 70 (71) be provided, preferably double-acting, one end of the shock absorber being pivotally fastened as by a ball and socket connection 72 to the frame 15 or body structure of the vehicle, while the other end of the shock absorber may be secured to the brake spider 65 as by a similar connection 73, which connections 72, 73 are preferably lubricated or rubber cushioned. Such pivotal arrangement provides for relative swinging movement about the axes of the connections 72, 73 and for the cooperation of the shock absorber with the torsion spring assembly in cushioning effectively road shocks whether the wheel be in position for motion of translation of the vehicle in a straight path or in a curved path.

This arrangement further provides effective shock-absorbing action under wheel deflection without objecitonable hindrance to normal steering action. In addition, such arrangement is effective during steering in providing damping action to control undesirable movements often referred to as wheel "disturbance" or wheel "fight," which control is desirable especially in wheel suspensions having change in camber during deflection. This advantageous function results from the construction shown, wherein the lower pivotal connection 73 is spaced radially from the king-pin axis and describes an arcuate path about such axis during steering, which alters the condition of the shock-absorber 70 such as to cause displacement of the fluid therein thereby providing the desired damping action during both steering movements and wheel deflection.

Figures 7, 8:
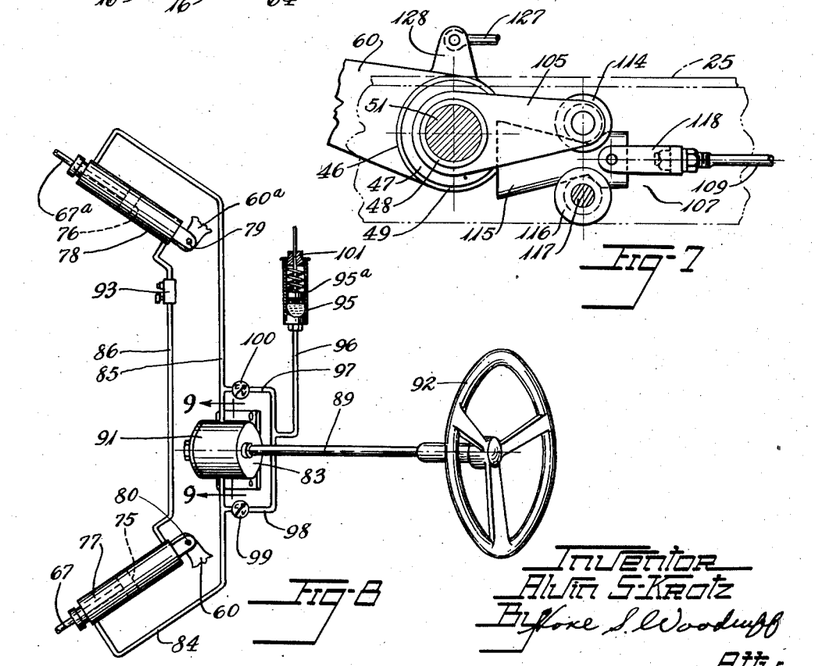
Fig. 7 is a sectional view taken along line 7—7 of Fig. 6 and showing a height adjusting mechanism, parts being broken away.
Fig. 8 is a plan view from above of an hydraulic steering system for the vehicle, parts being broken away and in section.

Although the steering means for the dirigible front wheels 16 and 17 may be a mechanical linkage arrangement, it is desirable for effectiveness of operation and simplicity of construction that such steering means be of a fluid-operated type, which may be arranged as shown especially in Figs. 6 and 8. The hydraulic steering means includes a pair of pressure-liquid operated motors including double-acting pistons 75, 76 within cylinders 77, 78 carried by the supporting arms 60, 60a of the torsion spring assemblies 45, 46 at pivotal connections 79, 80 at the ends of the cylinders nearest the torsion springs. The arrangement is such as to permit forwardly and rearwardly swinging movement of the cylinders 77, 78 of the motors relative to the supporting arms during turning movement of the wheels and to permit swinging such cylinders with the supporting arms about the axis of the torsion springs under wheel deflection so that steering is not affected by wheel deflection. The steering rods 67, 67a extend through the other ends of the cylinders 77, 78 and carry the pistons 75, 76 whereby reciprocating movement of the pistons acting through the steering rods causes the steering arms 68, 68a to rotate about the king-pin axis 63 for turning the wheels 16, 17. A suitable pump 83, which may be of the rotary vane type, for supplying pressure-liquid to the motors for actuating the double-acting piston and cylinder constructions is connected thereto by a substantially sealed primary piping system or circuit including flexible conduits 84, 85, 86 in communication with a fluid chamber 90 of the pump 83 and with the piston chambers of the cylinders 77, 78 at the respective ends thereof, which piping system contains fluid under pressure continuously, if desired. The pump 83 includes a rotatable impeller in the form of a rotor 87 having radial vanes 88, which rotor is mounted on a shaft 89 and disposed eccentrically within the fluid chamber 90 of a casing 91. The vanes 88 are urged outwardly as by springs for maintaining sliding contact with the wall of the chamber 90 during rotation of the rotor 87 by the turning of the shaft 89 or steering column on which shaft a steering wheel 92 may be mounted, as shown especially in Figs. 8 and 9. The assembly of pump, steering column and steering wheel may be advantageously disposed as a unit at a suitable location such as the left side or, if desired, at the right side or even in the center of the driving compartment of the vehicle.

The fluid conduit 86 interconnects the discharge sides of the steering motors at the cylinders 77, 78 at their inner ends nearest the pivotal connections 79, 80 and includes desirably an adjustor-restrictor member 93 intermediate such cylinders for damping out fluid-surges in the conduit 86 between the respective pistons 75, 76 to control non-recurring impacts on the wheels 16, 17 and/or periodic excitations of the wheels and the steering system and to permit adjusting the front wheel alignment by adjusting the fluid volume in the conduit 86. Fluid under pressure completely fills the piston chambers rearwardly of the pistons 75, 76 in the cylinders 77, 78 and the conduit 86 with little or no leakage occurring past the pistons, whereby such sealed and balanced portion of the primary circuit at the discharge side of the steering motors functions advantageously as an independent liquid interconnection directly between the steering motors and an hydraulic tie-rod between the front wheels assuring their coincidental turning movement in steering the vehicle and hydraulically maintaining their alignment.

The remainder of the primary circuit at the operating sides of the steering motors comprises the actuating or driving portion which includes the conduits 84, 85 and the pump 83, and which driving portion of the circuit is operatively associated with the balanced portion of the circuit to transfer fluid to and from the cylinders 77, 78 to move the pistons 75, 76. The fluid conduit 84, which is in communication at one side of the pump 83 with the fluid chamber 90, extends from the pump to the outer end of the cylinder 77. The fluid conduit 85 extends similarly from the other side of the pump 83 to the outer end of the other cylinder 78.

The flexible conduits 84, 85, 86 in combination with the double-acting piston and cylinder assemblies permit selectively pumping fluid, such as a suitable oil or other liquid, under pressure into the cylinders 77, 78 at either of the respective forward ends thereof, thereby causing coacting reciprocation of the pistons 75, 76 to actuate the steering rods 67, 67a and the steering arms 68, 68a in a manner to turn the wheels.

For maintaining the pump, the cylinders, and the piping system, especially conduits 84, 85, completely filled with oil at all times, a fluid reservoir 95 having a spring-operated piston 95a therein may be connected to the piping system through suitable Y-arranged conduits 96, 97, 98, the conduits 97 and 98 being in communication with the flexible conduits 84, 85. The fluid-feeding conduits 97, 98 include suitable check valves 99, 100 for permitting inflow of make-up oil under pressure and for preventing reverse flow of oil from the piping system toward the fluid reservoir 95, especially when the pump 83 is operating. Such reservoir 95 may have a detachable end closure 101 for facilitating the addition of make-up oil to the piping system to compensate for leakage losses of oil.

In the steering operation, the steering wheel 92 may be rotated, for example, in the clockwise direction looking toward the front of the vehicle and such rotation by its continuous turning of the impeller or rotor 87 causes the rotary pump 83 to draw oil from the conduit 85 of the driving portion of the circuit and pump oil under pressure into the conduit 84, which moves the piston 75 in the cylinder 77 toward the end nearest the pivotal connection 80. Oil under pressure flows through the conduit 86 of the balanced portion of the circuit into the other cylinder 78 at the end nearest the pivotal connection 79 which forces the piston 76 to move toward the other end of the cylinder 78. Such reciprocating movements of the pistons actuate the steering rods 67, 67a and the steering arms 68, 68a in a manner to pivot the wheels 16, 17 about the king-pin axes 63, 63 toward the right side of the vehicle for turning the latter to the right. Similarly, rotation of the steering wheel 92 in the counter-clockwise direction reverses the direction of oil flow through the conduits 84, 85, 86 thus moving the pistons 75, 76 in the cylinders 77, 78 in the opposite directions whereby the wheels 16, 17 are turned toward the left side of the vehicle for turning the latter to the left. Such a fluid-operated steering arrangement makes possible effectively steering the vehicle unaffected by wheel deflection and in a manner wholly responsive to the will of the operator, and also provides sensitivity of steering control independent of wheel deflection together with providing for hydraulically maintaining wheel alignment, for damping out sideward road-shocks or other disturbances of the wheels and for resisting transmission of such disturbances through the steering system to the operator.

To the end of automatically maintaining an adequate range of springing movement of the front wheels under all conditions of load together with softness of springing despite variations in load, the invention provides automatic adjusting means in association with the torsion spring assemblies 45, 46, as shown especially in Figs. 1, 2 and 4 to 7. The automatic adjusting means includes adjusting arm structures 105, 106 fixed to the journaled inner shaft elements of such spring assemblies adjacent the X-members 24, 25 of the frame 15. While the arm structures 105, 106 may be swung to positions of adjustment by various constructions, in the illustrated arrangement this is accomplished by cam and follower mechanisms 107, 108 operable through a pivoted linkage structure including link members 109, 110, 111 and a bell crank 112 driven as by a reversible electric motor power unit 113 which may be secured to the X-member 24 rearwardly of the gusset plates 26, 27.

The adjusting arm structure 105 for the torsion spring assembly 46, as shown especially in Fig. 7, may have a rotatable follower element 114, which rides on the upper shaped surface of a cam 115, preferably wedge-shape, of the mechanism 107. The cam 115 at its lower shaped surface rests upon a rotatable follower element 116 of the mechanism 107 journaled on a shaft 117 fixedly secured to the X-member 25, which follower element 116 may be positioned in substantially spaced-apart alignment with the other follower element 114 for the low adjustment position shown in Fig. 7, and the cam 115 reciprocates in the fore and aft direction between such follower elements. The cam 115 is pivotally attached to an adjusting turnbuckle 118 having threaded engagement with the link member 109 or tension rod extending along the X-member 25, which link member 109 is also pivotally attached to the end of one of the arms of the bell crank 112 by a threaded connection 119. The bell crank 112 is pivotally mounted between the gusset plates 26, 27 on a shaft 120 for imparting reciprocating movement to the cam through the tension rod connections, the arms of the crank swinging through slots in the X-members.

The adjusting arm structure 106 and cam and follower mechanism 108 for the other torsion spring assembly 45 may be similarly arranged except that the adjusting turnbuckle is in threaded engagement with the link member 110 or tension rod extending along the X-member 24, which link member 110 is pivotally attached to the other arm of the bell crank intermediate its end and the mounting shaft 120 by a threaded connection 121. The link member 111, which may be a metal sleeve, is pivotally connected at 122 to the end of said other arm of the bell crank 112, and may be interiorly threaded for engaging a threaded driving rod 123 rotatively driven by the power unit 113 through a clevis connection 124. Such driving arrangement accommodates pivotal swinging movement of the bell crank 112 for permitting such movement to reciprocate the wedge cams of the mechanisms 107, 108, as shown especially in Fig. 1.

When the electric motor power unit 113 rotates the driving rod 123, for example, in the clockwise direction looking toward the front of the vehicle, the metal sleeve 111 moves toward the power unit which movement in turn pivots the bell crank 112 about the shaft 120 in a manner such that the tension rods 109, 110 move in the rearward direction. Such rearward movement pulls the wedge cams rearwardly between the follower elements of the mechanisms 107, 108 thereby swinging the adjusting arm structures 105, 106 upwardly and rotating the inner shaft elements of the torsion spring assemblies 45, 46. Such rotation of the inner shaft elements changes the torsion stresses in the rubber bodies of the spring assemblies in a manner such that the resultant force urges the frame or body structure 15 upwardly relative to the front wheels. Rotation of the power unit 113 in the counter-clockwise direction reverses the hereinabove-described adjustment of the torsion spring assemblies 45, 46 inasmuch as the cams of the mechanisms 107, 108 move toward the inner shaft elements permitting the adjusting arm structures 105, 106 to swing in the downward direction thus effecting a change in the torsion stress in the rubber bodies of the spring assemblies such that the resultant force urges the frame downwardly toward the front wheels.

The automatic adjustment of the height of the frame or body structure with respect to the front wheels such, for example, as when changes in load occur, is accomplished by an actuating control means regulating the operation of the power unit 113 of the automatic adjusting means, and the control means may be arranged to coact responsively with either or both front wheels and preferably with the left front wheel suspension 16a, as shown especially in Figs. 1, 2 and 4. Such control means includes a switch assembly 125 of the delaying relay type which may be mounted on a bracket 126 attached to the frame 15 in a position to be operated by a switch-operating rod 127 extending from the switch assembly to a U-shape support member 128 carried by the outer sleeve 49 of the torsion spring 46 at the supporting arm 60. The switch-operating rod 127 has a pivotal connection at 127a with the support member 128 and may extend through an aperture in the free end portion of a switch lever 129 in sliding relation therewith, which lever is secured to the projecting end portion of a rotative shaft 130 of the switch assembly.

Equalizing coil springs 131, 132 of the compression type may be positioned adjustably on the switch-operating rod 127 at each side of the journaled switch lever 129 and between adjusting nuts 133, 134 threadedly engaging the rod 127 at opposite ends of such springs. The coil springs accommodate rapid reciprocating movements of the switch-operating rod with small change in the open-switch position of the lever, as shown especially in Fig. 4, until a determinate and relatively sustained change in load condition is reached, for which latter condition the switch lever is permitted to actuate the switch assembly, as hereinafter described, for closing the electrical circuit.

The switch assembly 125 has the journaled shaft 130 centrally positioned between the ends of a partitioned casing 135 and extending transversely thereof through apertures in the walls of a fluid compartment 136 in sealing relation therewith and into a switch contact compartment 137 having a detachable outer wall. The fluid compartment having a detachable filler cap 138 in its upper wall for admitting fluid such, for example, as oil, is in communication with a cylinder compartment 139 through spaced-apart apertures 140, 141, 142 in its lower wall, which apertures permit oil to flow therethrough to and from the fluid and the cylinder compartments. A piston actuating arm 143, which is secured to the shaft 130 for oscillatory movement, extends downwardly through the elongated aperture 142 into operative engagement with a double-acting centrally bored piston 144 for reciprocating such piston in the cylinder compartment, which latter compartment may be closed at its ends by detachable sealing nuts 145, 145 for service purposes. Such an arrangement provides for delaying or damping the swinging movements of the switch lever 129 operating the switch assembly 125.

Upper and lower limit electrical contact elements 146, 147 are secured at spaced-apart positions to the detachable outer wall of the contact compartment 137 adjacent the upper wall thereof and are adapted to be contacted by an arcuate member 148 secured to the shaft 130 and rotating therewith, which shaft may be electrically grounded. Electrical wires 149, 150 joined to the contact elements 146, 147 connect the switch assembly 125 to the electrical circuit including the power unit 113. A suitable manual type switch (not shown) may be provided in the electrical power line of the circuit, preferably in conjunction with the ignition switch for the engine and/or at a position convenient to the operator of the vehicle, for rendering the automatic height adjusting mechanism operative or inoperative at will.

In the operation of the automatic height adjusting means, the switch assembly 125 is normally in the open electrical condition with the switch lever 129 substantially in the open-position, as shown especially in Fig. 4, when the electrical motor of the power unit 113 is stopped so that the frame 15 or body structure is maintained at a determinate normal height with respect to the front wheels 16, 17. Upon increasing the load on the vehicle, the frame tends to descend with respect to the wheel spindle 64 causing the supporting arm 60 to swing ascendingly about the axis of the torsion spring assembly 46 rotating the outer sleeve 49 such that the switch-operating rod 127 is urged rearwardly for a sufficient time and to a sufficient extent to overcome the delaying or damping action of the switch assembly and to swing the switch lever 129 so that the arcuate member 148 contacts the contact element 146 completing the electrical circuit, assuming the operator has closed the switch in the power line.

With the closing of the electrical circuit, the power unit 113 rotates the driving rod 123 such that the link member 111 is moved toward such power unit so that the tension rods 109, 110 move rearwardly together causing the cams to urge the adjusting arm structures 105, 106 in the upward direction so that the height of the frame is changed simultaneously with respect to the two front wheels 16, 17. Such movement of the arm structures 105, 106 rotates the inner shaft elements of the torsion spring assemblies 45, 46 in the direction to cause elevation of the frame with respect to the wheels. This action continues until the frame has risen with respect to the wheel spindle 64 to a position where the switch assembly is returned to the open condition with the switch lever 129 in the open-position, whereupon, by stoppage of the power unit 113, the mechanism is held in the adjusted position so that the normal height of the frame with respect to the front wheels is maintained constant or substantially constant despite the increased load.

Upon relieving the vehicle of load, the frame 15 tends to ascend with respect to the wheel spindle 64 causing the supporting arm 60 to swing descendingly about the axis of the torsion spring assembly 46 and moving forwardly the switch-operating rod 127 in a manner to actuate the arcuate member 148 of the switch assembly into contact with the other contact element 147 completing the electric circuit. Such closing of the electric circuit reverses the rotation of the power unit 113 and driving rod 123 causing forward movement of the tension rods 109, 110 and cams, which permits swinging simultaneously the adjusting arms 105, 106 in the downward direction rotating the inner shaft elements in the direction to lower the frame with respect to the front wheels. This action continues until the switch assembly 125 is again opened and the power unit 113 stopped so that the height relation of the frame and the wheels is again restored.

In view of the foregoing description it is apparent that the invention provides an improved construction making possible effectively maintaining a large amplitude of springing despite substantial variations in load on the vehicle and softness of spring of the front wheels despite such load variations. Also, such improved construction provides for height adjustment of one wheel with respect to the other wheel by means of independently adjusting the tension rods 109, 110 to position the cams as desired relative to the adjusting arms 105, 106. This adjustment permits overcoming unequal creeping of the torsion springs resulting from non-elastic yielding of the rubber in use and it permits adjustment to level the vehicle laterally.

The respective suspensions 18a and 19a of the rear wheels 18, 19 are each of the independent type. These suspensions 18a and 19a provide for spring the rear wheels relative to the frame or body structure 15 by means of a pair of resilient rubber torsion spring assemblies 150, 151 carried by the frame and arranged in a diagonal manner such that their axes extend obliquely outward. While the spring assemblies may be arranged in various ways and the frame or other structure varied accordingly, in the illustrated arrangement, the axes of the springs converge toward the rear of the vehicle, thereby making possible the desired effective arms of swinging movement. The rear torsion spring assemblies 150, 151 are constructed and arranged substantially like the front torsion spring assemblies 45, 46 and are adapted to transmit the supported load by torsional stress on the rubber and to permit limited cushioned movement in the fore and aft and vertical directions.

The left rear suspension 18a is constructed substantially like the right rear suspension 19a; hence only the left rear suspension will be described in detail. The torsion spring assembly 150 of the left rear suspension 18a, which is diagonally positioned relative to the vertical longitudinal center-plane or plane of symmetry 15a of the vehicle, is desirably arranged forwardly of the axle 42 so that the axis of the spring assembly 150 intersects the pivotal axis of a ball and socket joint connection 152 at the junction of the half-axle 42 and a differential gear housing 153, as shown especially in Fig. 1, the arrangement being such that longitudinal and transverse effective arms of the desired length are provided.

The rear wheels in the construction shown, are not provided with steering mechanism and therefore a shorter transverse effective arm may be employed in the rear than in the front, this resulting in greater change in track for the rear wheels, giving higher effective roll center and resistance to roll of the vehicle as a whole. The longitudinal effective arm being the distance from ground contact of the wheel to the point where the spring axis intersects the longitudinal vertical plane of the wheel, may be so proportioned, forward of the wheel, that braking reaction will cancel to any desired degree the tendency of the rear of the vehicle to lift during brake application.

The fore and aft forces on the wheel, as in accelerating or braking, and the vertical forces due to the elastic support of the sprung portions of the vehicle are taken through the rubber of the torsion spring, making bearings of any sort unnecessary thereby simplifying and lightening the construction and absorbing harshness of ride which would result from rigid bearings. Transverse forces may be taken by the provision of the ball of the ball and socket connection 152 attached to the inner end of the half-axle 42 and journaled spherically in the differential gear housing 153. Optionally, a slip joint 152a between the ball of the connection 152 and the half-axle 42 together with a splined or other flexible joint in the drive shaft which drives the wheel 18 may be included, in which case the torsion spring assembly 150 provides also for the transverse location of the wheel 18 by means of its elastic location on its axis.

Figure 3:
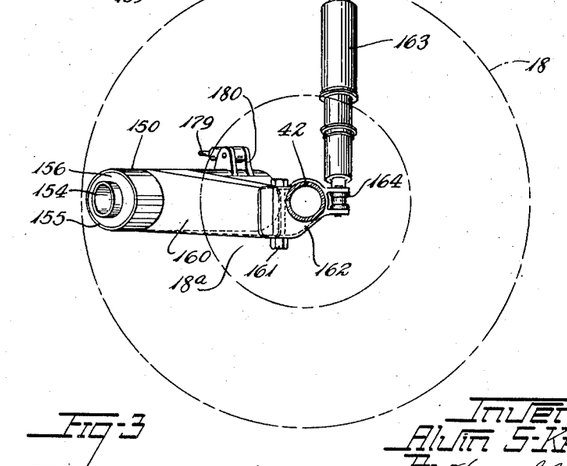
Fig. 3 is a side elevation of the left rear wheel mounting, the wheel assembly being shown in broken lines and parts being broken away and in section.

The torsion spring assembly 150 having an inner shaft element 154, an outer sleeve structure 155 and a resilient rubber body 156 therebetween and bonded thereto, may be rotatively journaled at one end of the inner shaft 154 on a suitable mounting structure 157 carried by the frame 15 at the corner plate 30 and is similarly journaled at the other end of the inner shaft 154 on a support member 158 attached to the housing 153, as shown especially in Fig. 1. The housing 153 is suitably mounted on the frame 15 between the rear cross members 40, 41 and may have resilient mountings 159 of suitable rubber material. A supporting arm 160 is rigidly secured to the outer sleeve structure 155 and may extend perpendicularly and rearwardly relative to the axis of the spring assembly, the end of the supporting arm being attached as by a bolted connection 161 to a torque bracket 162 rigidly secured to the half-axle 42 adjacent the wheel 18, as shown especially in Figs. 1 and 3. A suitable direct-acting shock absorber 163 is carried by the torque bracket 162 rearwardly of the axle housing and secured to the frame 15, the connection at 164 of the shock absorber 163 to the torque bracket 162 and also to the frame 15 being of the pivotal rubber cushioned type to accommodate relative angular movement. The shock absorber 163 cooperates with the torsion spring assembly 159 in cushioning road shocks.

The rear springing arrangement in addition to providing effective springing action also resiliently maintains the half-axles 42, 43 in substantial alignment and effectively resists torque reaction and driving thrust while avoiding the use of brace rods, radius rods, torque arms secured to the axles and other related mechanical expedients generally resorted to for such purposes.

Since the torsion spring assembly is self-aligning and requires no bearings as discussed hereinabove, bearing friction with its undesirable drag or dry friction effect is eliminated. The torsion spring assembly by virtue of the resiliency of its rubber body does provide some damping effect in the characteristic hysteresis of such springs and the shock absorber is, therefore, called upon only to control a partially self-damping springing arrangement with minimum dry friction effect.

In addition to the feature of automatic adjustment of the front wheels, the invention provides automatic adjusting means in association with the rear torsion spring assemblies 150, 151, as shown in Fig. 1, for automatically maintaining an adequate range of springing movement of the rear wheels 18, 19 under all conditions of load together with softness of springing despite variations in load. Such rear automatic adjusting means in the construction shown is operable independently of the front adjusting means and is constructed and arranged substantially like the automatic adjusting means for the front wheels 16, 17. The rear adjusting means includes suitable adjusting arm structures 165, 166 fixed to the journaled inner shaft elements of the rear torsion spring assemblies 150, 151, which arm structures 165, 166 are swung to positions of adjustment by suitable cam and follower mechanisms 167, 168 operable through a suitable pivoted linkage structure including link members 169, 170, 171 and a bell-chank 172 driven by a suitable power unit 173 which may be secured to the X-member 24 forwardly of the gusset plates 26, 27, as shown especially in Fig. 1, the bellcrank 172 being pivotally mounted on a supporting bracket 174 secured to the X-member 25. The link member 171 is threadedly engaged with a suitable driving rod 175 connected by a clevis connection 176 to the power unit 173 for actuating the linkage structure.

Suitable actuating control means for regulating the operation of the power unit 173 may be arranged to coact with either or both rear wheels and preferably with the left rear wheel suspension 18a. Such control means includes a suitable switch assembly 177 mounted on a bracket 178 attached to the cross member 23 in a position to be operated by a suitable switch-operating rod 179 extending from the switch assembly to and pivotally connected with a U-shape support member 180 carried by the outer sleeve structure 155 of the torsion spring assembly 150 at the supporting arm 160. The arrangement of the switch assembly 177 with the switch-operating rod 179 is substantially like the arrangement of the switch assembly 125 with the switch-operating rod 127 with respect to equalizing coil springs 181, 182 and switch lever 183 construction and operative relationship so as to facilitate the desired delaying relay functioning of the actuating control means, as described hereinabove for the front wheel suspensions 16a, 17a. Suitable electrical wires 184, 185 connect the switch assembly 177 to the electrical circuit including the power unit 173, the switch assembly being electrically grounded. The automatic height adjusting mechanism may be rendered operative or inoperative at will as by a suitable manual type switch (not shown) in the electrical circuit for the power unit 173.

The adjusting means for the rear wheels operates substantially in the same manner as described hereinabove for the adjusting means for the front wheels. For increase in load, the frame 15 or body structure tends to descends toward the rear wheels whereupon the supporting arm 160 swings ascendingly about the axis of the torsion spring assembly 150 rotating the outer sleeve 155 such that the switch-operating rod 179 moves forwardly closing the switch assembly 177 and operating the power unit 173. The power unit actuates the rear linkage structure such that the arm structures 165, 166 are swung upwardly rotating the inner shafts of the torsion spring assemblies 150, 151 in the direction to cause elevation of the frame 15 with respect to the rear wheels. This action continues until the normal height of the frame with respect to the rear wheels is attained whereupon the power unit 173 is stopped through the operation of the switch-operating rod 179 and the switch assembly 177 opening the electrical circuit. For decrease in load, the frame 15 tends to ascend with respect to the rear wheels and a reverse action of the adjusting means occurs until the normal height relation of the frame and the wheels is again restored.

The construction and arrangement of cooperating elements in the new relationship described hereinabove advantageously makes possible an improved vehicle design and construction resulting in improved riding and steering qualities and having an improved wheel mounting and suspension of a compact unitary character utilizing resilient rubber-like material as the spring medium.

Variations may be made without departing from the scope of the invention as it is defined in the following claims.

I claim:

1. A vehicle suspension comprising a dirigible wheel structure at an end of the vehicle, a supported structure, a shaft member mounted on said supported structure at said end with the axis of the member disposed in the generally horizontal direction and obliquely intersecting the vertical longitudinal center-plane of the vehicle at said end, a sleeve member disposed about said shaft member for movements relative thereto in axial, radial, tilting and rotational directions and having an arm projecting therefrom toward said end obliquely away from said center-plane and at its outer end having a wheel mounting element, said element having a pivotal steering connection with said wheel structure holding the wheel and arm for springing deflection without change in the relation of the wheel with respect to said arm as a result of the vertical swinging thereof, said arm by virtue of its oblique disposition and the oblique disposition of said shaft member translating shock forces imposed on said wheel in each of the longitudinal and transverse directions of the vehicle into combined axial and radial movements of said sleeve member relative to said shaft member, and also translating the vertical deflections of said wheel into relative rotative movements of said members, a body of resilient rubber-like material between said members and secured thereto for resiliently resisting all movements of the arm and wheel as a unit with respect to said axis through stresses on said body in the axial, radial, tilting and rotational directions and combinations thereof, and steering means including an operating element pivotally mounted directly on said arm intermediate the ends thereof and pivotally connected to said wheel structure for steering the same.

2. In a vehicle, in combination, a supported structure, a wheel structure, means for mounting said wheel structure on said supported structure for steering movement of said wheel structure about an axis and a shock-absorber connected to said supported structure and to said wheel structure at a position on a non-rotatable steerable part of the latter spaced from the steering axis for action of the shock-absorber during and as a result of steering movements.

3. In a vehicle, in combination, a supported structure, an arm mounted for vertical swinging movement with respect to said supported structure, a wheel structure mounted on said arm for vertical swinging movement therewith and having a pivotal steering connection with said arm for steering movement of said wheel structure about an axis, springing means between said supported structure and said arm, and a shock-absorber connected to said supported structure and to said wheel structure at a position on a non-rotatable steerable part of the latter spaced from the steering axis for action of the shock-absorber during and as a result of both the swinging and the steering movements.

4. In a vehicle, in combination, a supported structure, an arm mounted for vertical swinging movement with respect to said supported structure, a wheel structure mounted on said arm for swinging movement of the arm and wheel as a unit with respect to said supported structure without change in the relation of the wheel with respect to the arm as a result of the vertical swinging thereof, springing means between said supported structure and said arm, said wheel structure having a pivotal steering connection with said arm for steering movement of said wheel structure about an axis, and a shock-absorber connected to said supported structure and to said wheel structure at a position on a non-rotatable steerable part of the latter spaced from the steering axis for action of the shock-absorber during and as a result of both the swinging and the steering movements.

5. A vehicle suspension comprising a wheel structure, a supported structure having a pair of spaced-apart stud extensions axially aligned in a direction oblique to the vertical longitudinal center-plane of the vehicle, a shaft-member rotatably mounted on said stud extensions, means for adjustably holding said shaft member against rotation with respect to said stud extensions, a sleeve member disposed about said shaft member for movements relative thereto in axial, radial, tilting and rotational directions and having an arm projecting therefrom obliquely of said center-plane and at its outer end having a supporting connection with said wheel structure for movements of the arm and wheel as a unit in all directions including swinging movements thereof about the axis of said stud extensions, said arm by virtue of its oblique disposition and the oblique disposition of said shaft member translating shock forces imposed on the wheel in each of the longitudinal and transverse directions of the vehicle into combined axial and radial movements of said sleeve member relative to said shaft member and also translating the vertical deflections of said wheel into relative rotative movements of said members, and a body of resilient rubber-like material between said members and secured thereto for resiliently resisting said movements of said arm and wheel as a unit through stresses on said body in the axial, radial, tilting and rotational directions and combinations thereof with respect to said axis, and said arm including at its outer end a wheel mounting element having a pivotal connection with said wheel structure for steering movement thereof about an axis, said wheel structure having a projecting steering member, and said arm having steering means including an operating element pivotally mounted directly on said arm, said operating element being pivotally connected to said steering member of said wheel structure for steering the latter.

6. A vehicle suspension as defined in claim 5 in which said suspension comprises a direct-action shock-absorber pivotally attached in shock-absorbing relation to said supported structure and to said wheel structure at a position on a non-rotatable steerable part of the latter spaced from said axis of steering movement for action of the shock-absorber during and as a result of both the swinging and the steering movements of said wheel structure.

ALVIN S. KROTZ.

REFERENCES CITED

The following references are of record in the file of this patent:

UNITED STATES PATENTS

| Number | Name | Date |
|---|---|---|
| 1,100,350 | Brown | June 16, 1914 |
| 1,151,822 | Reese | Aug. 31, 1915 |
| 1,946,948 | Roos | Feb. 13, 1934 |
| 2,053,869 | Haltenberger | Sept. 8, 1936 |
| 2,063,747 | Olley | Dec. 8, 1936 |
| 2,080,969 | Macbeth | May 18, 1937 |
| 2,092,613 | Olley | Sept. 7, 1937 |
| 2,111,668 | Latzen | Mar. 22, 1938 |
| 2,163,131 | Porsche | June 20, 1939 |
| 2,164,838 | Porsche | July 4, 1939 |
| 2,167,984 | Leighton | Aug. 1, 1939 |
| 2,191,211 | Krotz | Feb. 20, 1940 |
| 2,226,406 | Krotz | Dec. 24, 1940 |
| 2,232,173 | Frohlich | Feb. 18, 1941 |